United States Patent [19]

Carmel et al.

[11] Patent Number: 4,986,149
[45] Date of Patent: Jan. 22, 1991

[54] SYSTEM FOR FINAL BALANCING OF CAST METAL BRAKE DRUMS

[75] Inventors: Edwin L. Carmel, Cincinnati; Robert A. DeRegnaucourt, Centerville; Lee Reichel, Kettering, all of Ohio

[73] Assignee: Dayton-Walther Corporation, Dayton, Ohio

[21] Appl. No.: 335,431

[22] Filed: Apr. 10, 1989

[51] Int. Cl.⁵ .................... B23B 1/00; B23B 5/02; B23B 25/06
[52] U.S. Cl. .................................... 82/1.11; 82/112; 82/903; 73/66
[58] Field of Search ............... 82/1.11, 112, 903, 904; 73/66

[56] References Cited

U.S. PATENT DOCUMENTS

| 2,693,695 | 11/1954 | Jacobsen et al. | 82/903 |
| 2,731,887 | 1/1956 | Sjostrand | 73/66 |
| 2,792,725 | 5/1957 | Lannen | 73/66 |
| 3,076,363 | 2/1963 | Hack | 82/117 |

Primary Examiner—William E. Terrell
Attorney, Agent, or Firm—Mack D. Cook, II

[57] ABSTRACT

A system for final balancing of first machined cast metal brake drums using a conventional static balancer with an electronic ounce/inch imbalance recorder and a conventional lathe with adjustable chuck and cutting tool controlled by computer developed analogs for a recorded ounce/inch imbalance.

8 Claims, 5 Drawing Sheets

SYSTEM FOR FINAL BALANCING OF CAST METAL BRAKE DRUMS

BACKGROUND OF THE INVENTION

The production of cast metal brake drums for heavy-duty vehicle wheels begins with a conventional sand-patterned mold casting operation. After cleaning, the raw cast brake drums are precision drilled and concentrically machined to dimensional tolerances determined by extrinsic factors of vehicle design. The wheels, axles and braking system each affect the "design dimensions" of a finished cast brake drum. However, it is well known to each of the several engineering disciplines providing factors involved in design of vehicles that a finished cast brake drum with useable "design dimensions" may or may not have a "final balance" which is acceptable for vehicle operation under dynamic or a range of road conditions and vehicle speeds.

The present invention relates to a system, method or process which will use conventional and relatively inexpensive factory machines for final balancing of a cast metal brake drum by cutting away a crescent or wedge of the cast material from the drum squealer band or any outside drum surface which is cylindrical, conical or subtantially perpendicular relative to the designed center or rotational axis of the drum.

The scope and content of the prior art has been determined as explained below.

The following United States patent references have been identified as broadly disclosing removing material that causes an imbalance from a work piece after having determined the area to be displaced:

U.S. Pat. No. 1,731,922, Eaton, Oct., 1929. (balancing rotors, such as armatures of dynamo-electric machines); U.S. Pat. No. 2,690,075, Kryeske, Sept., 1954. (a rotating body is dynamically balanced by relocating its center of rotation); U.S. Pat. No. 2,731,887, Sjoestrand, Jan., 1956. (balancing a rotatable body by removing material from the heaviest side or applying material to the lightest side); U.S. Pat. No. 2,792,725, Lannen, May, 1957. (machine for balancing a circular work-piece 16 using a drilling unit 70, 71, 72); U.S. Pat. No. 2,937,613, Larsh, May, 1960. (a dynamic balancing machine which eliminates the need for any instrument which measures the magnitude of the unbalanced condition); U.S. Pat. No. 3,295,413, De Castelet, Jan., 1967. (a French invention, an engine crankshaft balancing installation using a "want-of-balance" measuring machine positioned along a crankshaft transfer path); and, U.S. Pat. No. 4,545,021, Suzuki, et al., Oct., 1985. (a Japanese invention, a seven-step (a) through (g) method for correcting dynamic unbalance of an electric motor rotor). This investigation was conducted within Class 73, subclasses 66, 459, 460, 461 and 487.

Other United States patent references were identified in Class 82, subclasses 1C, 2A*, 4A*, 8, 38A and Dig. 8*, and Class 188, subclass 218A. U.S. Pat. No. 4,586,407, Nall, May, 1986 discloses the use of lathe-type machine tools for machining cylindrical or tubular work-pieces to remove axial peripheral irregularity and refers to conventional lathe-type machines with an incrementally adjustable tangent cutting tool. U.S. Pat. No. 4,656,896, Bietz et al., April, 1987, a French invention, relates to a digitally controlled lathe and a radially adjustable chuck axis for the parts to be machined. U.S. Pat. No. 4,366,543; Feller, et al., Dec., 1982, discloses method and apparatus for the out-of-round machining of work-pieces (piston rings) with numerically or electronically programmable memory for controlling the radial feed of a cutting tool 6.

U.S. Pat. No. 3,076,363, Hack, Feb., 1963; U.S. Pat. No. 3,691,880, Ratteree, et al, Sept., 1972; U.S. Pat. No. 4,215,603, Jones, Aug., 1980; and U.S. Pat. No. 4,455,900, Callanan, et al., June 1984, each disclose machining work-pieces including brake drums.

SUMMARY OF THE INVENTION

It is an object of the invention to provide a cast metal brake drum with predetermined design dimensions and an acceptable final balance, as determined by engineering principles and factors for heavy-duty vehicle operation.

It is a further object to provide a commercially useable cast metal brake drum product, using known mold casting operations and conventional and relatively inexpensive factory machines.

It is the specific object of the invention to provide a system, a method or processes for providing an acceptable dynamic weight or final balance for a cast metal brake drum by a final machining step or operation of cutting away a crescent or wedge of cast material from the drum squealer band or any outside drum surface which is cylindrical or conical or substantially perpendicular relative to the designed center or rotational axis of the drum.

Still further, it is an object to provide a system for improving quantity and economical production of a cast metal brake drum which will be assisted and controlled by engineering laboratory use of a pre-programmed computer or computer assisted design (CAD) equipment.

The cast metal brake drum product for commercial use is shown in drawings FIG. 1 and FIG. 2. A drum product after casting is first concentrically machined to have precision dimensioned areas including a circumferential and radially projecting squealer band with outboard or inboard sides or edges substantially perpendicular to the designed center or rotational axis of the drum.

The first machined drum product further has as outside surfaces a cylindrical side or medial portion, and a slightly conical side or lower inner portion. As an end surface, a drum product has a bolt flange or closed portion. The bolt flange is exactly perpendicular to the designed center or rotational axis of the drum and will be precision drilled during first machining to accept wheel mounting bolts.

The system, according to the invention, uses a conventional static balancer with a human or robotic operator, and a conventional turning lathe for human or robotic control set-up. The lathe has an adjustable chuck for positioning and clamping a first machined brake drum and an incrementally adjustable cutting tool for removing metal from outer surface areas of a brake drum on the lathe chuck.

According to the system, the static balancer is used to determine whether the first machined brake drum has an acceptable final balance. If the drum has a determined imbalance which is not acceptable, an ounce/inch value for the imbalance amount is recorded and an imaginary line extending from the axis of the static balancer toward the apparent center of the imbalance is observed. A reference point for the observed imaginary line is marked on a drum surface, preferably at a point on the squealer band opposite to the apparent center of imbalance. The marked drum is then moved by human or robotic transfer to a conventional lathe.

The next operations of a system according to the invention may be used in several embodiments.

In a first embodiment, the first machined brake drum is positioned and clamped by the lathe chuck so that the turning axis of the lathe is radially offset at a distance from the designed center axis of the drum which is a distance analog for the ounce/inch value determined and recorded using the static balancer. And, the offset distance is aligned toward an intersection with the reference point marked on a drum surface at the static balancer. Thereafter, the positioned and clamped drum and the lathe chuck are turned so that the cutting tool will incrementally cut away a crescent from an outside drum surface to a variable depth which is a distance analog for the ounce/inch value determined and recorded using the static balancer.

In a second embodiment, the first machined brake drum is positioned and clamped by the lathe chuck so that the turning axis of the lathe is radially offset at a distance from the designed center axis of the drum which is a distance predetermined by experience of a human or robotic operator with an ounce/inch imbalance amount for other brake drums of the same or equivalent design. And, the offset distance is aligned toward an intersection with the reference point marked on a drum surface at the static balancer. Thereafter, the positioned and clamped drum and the lathe chuck are turned so that the cutting tool will function the same as in the first embodiment.

In a third embodiment, the first machined brake drum is positioned and clamped in the same manner as the first embodiment and thereafter the positioned and clamped drum and the lathe chuck are turned so that the cutting tool will incrementally cut away a crescent from an outside drum surface to a fixed depth which is a distance predetermined by experience of a human or robotic operator with an ounce/inch imbalance amount for other brake drums of the same or equivalent design.

For each of these three embodiments, the cutting tool may be positioned to cut away a crescent from an outside squealer band surface.

There are two further embodiments wherein the first machined brake drum is positioned and clamped in the lathe chuck so that the turning axis of the lathe is tilted at an angle from the designed center axis of the drum which is an angle analog of the ounce/inch value determined and recorded using the static balancer. And, the tilted distance is aligned toward an intersection with the reference point marked on a drum surface at the static balancer. Thereafter, the positioned and clamped first machined drum and the tilted chuck are rotated so that the cutting tool will incrementally cut away a wedge from a drum surface which is substantially perpendicular or exactly perpendicular to the designed center or rotational axis of the drum.

For the fourth embodiment, the positioned and clamped drum and the tilted chuck are turned so that the cutting tool will incrementally cut away a wedge from a drum surface to a variable depth which is a distance analog for the ounce/inch value determined and recorded using the static balancer.

For the fifth embodiment, the positioned and clamped drum and the tilted chuck are turned so that the cutting tool will incrementally cut away a wedge from a drum surface to a fixed depth which is a distance predetermined by experience of a human or robotic operator with an ounce/inch imbalance amount for other brake drums of the same or equivalent design.

Practice of all embodiments of the invention will require that human or robotic operators have access to a conventional computer system to develop the distance and angle analogs for the ounce/inch values determined and recorded using the static balancer. The computer system will feature computer assisted design (CAD). The geometric values for the design dimensions of a brake drum product will be entered into the computer to develop a three dimensional mathematical model. The model will be modified incrementally by: (a) adjusting a center for rotation of the drum model various amounts from the designed center, and, (b) adjusting drum model outside surfaces (usually the squealer band) to remove various depth crescents or wedges. Thereafter, the computer system is commanded to calculate the amount and center of the weight removed by the cut crescents or wedges. The computer is further commanded to provide a distance analog or an angle analog so that an observed and a production specific ounce/inch imbalance amount will be an equivalent to a specific tool cutting depth and an amount of weight removed.

IN THE DRAWINGS

DETAILED DESCRIPTION OF THE INVENTION

Figure 1:
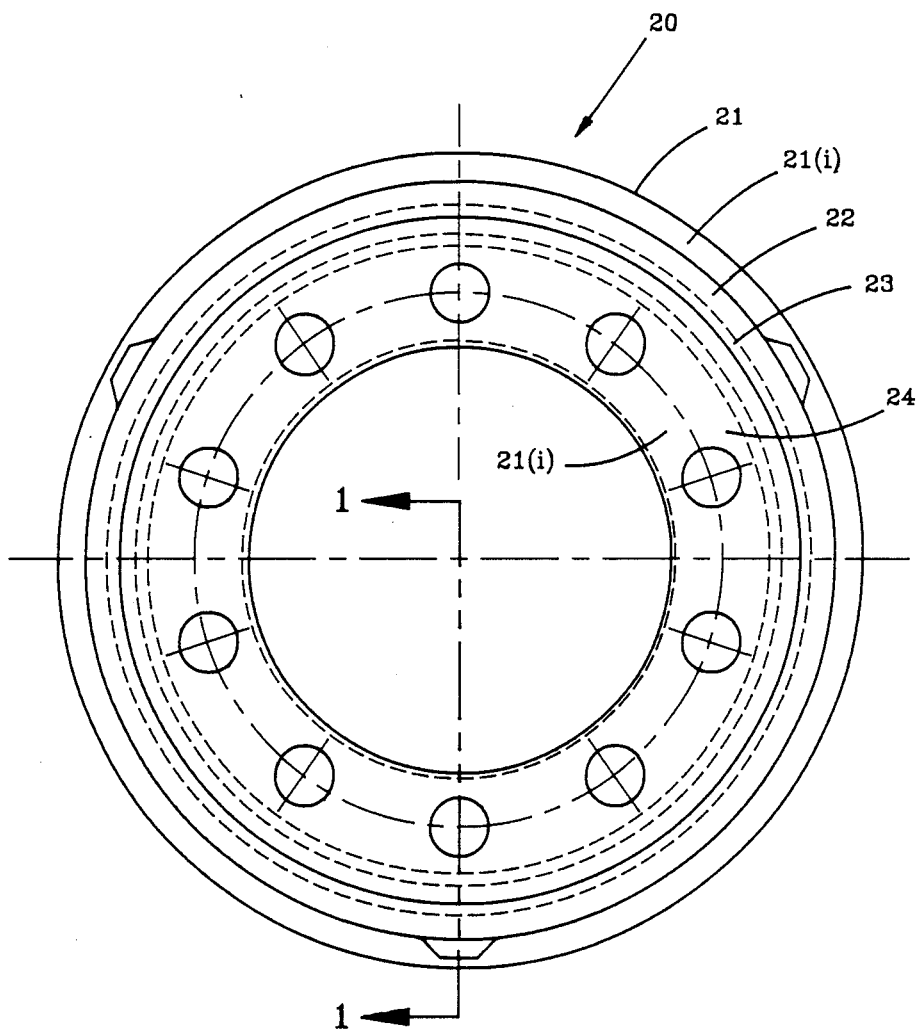
FIG. 1 is a plan view of a cast metal brake drum product made and sold by the inventors' assignee.

A cast metal brake drum product first machined to predetermined design dimensions is referred to generally by the numeral 20.

A drum 20 will have outside surfaces including a "squealer band" 21, a side or medial portion 22, a side or lower inner portion 23 and a bolt flange or closed portion 24. The squealer band 21 has outboard and inboard sides or edges, 21(*i*) and 21(*o*), substantially perpendicular to the rotational axis of a drum 20. The closed portion 24 has an outboard surface 24(*o*) exactly perpendicular to the rotational axis of a drum 20.

For the first step (a) in a system according to the invention, after casting and after first machining, a drum 20 is transferred to a conventional static balancer 25. A balancer 25 has a cone platform 26 with a jig or fixture 27 to support and to exactly center a first machined drum 20. As the first step (a) in a system according to the invention, the balancer 25 is used to determine whether or not a drum 20 has a weight imbalance which will show as a tilt or deflection of the support 27 relative to the cone platform 26. If any determined weight imbalance is within commercially acceptable tolerances, the drum 20 is marked "Ship to Customer." If a static balanced drum 20 has a determined imbalance which is not acceptable, the drum 20 is subjected to the second step (b) in a system according to the invention.

During step (b), a conventional sensor unit 28, integrated with a balancer 25, is used to record an analog or datum figure for the determined ounce/inch value for a weight imbalance of the drum 20 on a cone platform 26. The sensor unit 28 may also have a video screen or CRT 28A to graphically present a set up for the lathe, chuck and cutting tool, as described below.

Concurrently, an intelligent decision is made when viewing the drum 20 on the balancer 25 to observe an imaginary line extending from the axis of the balancer 25 toward the apparent center of the imbalance, which is the third step (c) in a system according to the invention.

Figure 3A:
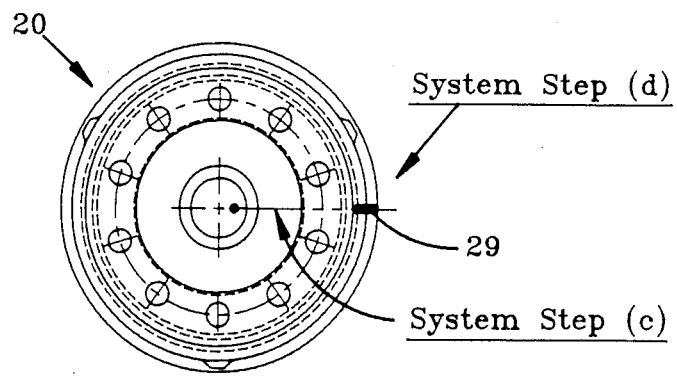
FIG. 3A is a schematic top view of the static balancer production station shown in FIG. 3.
Figure 3:
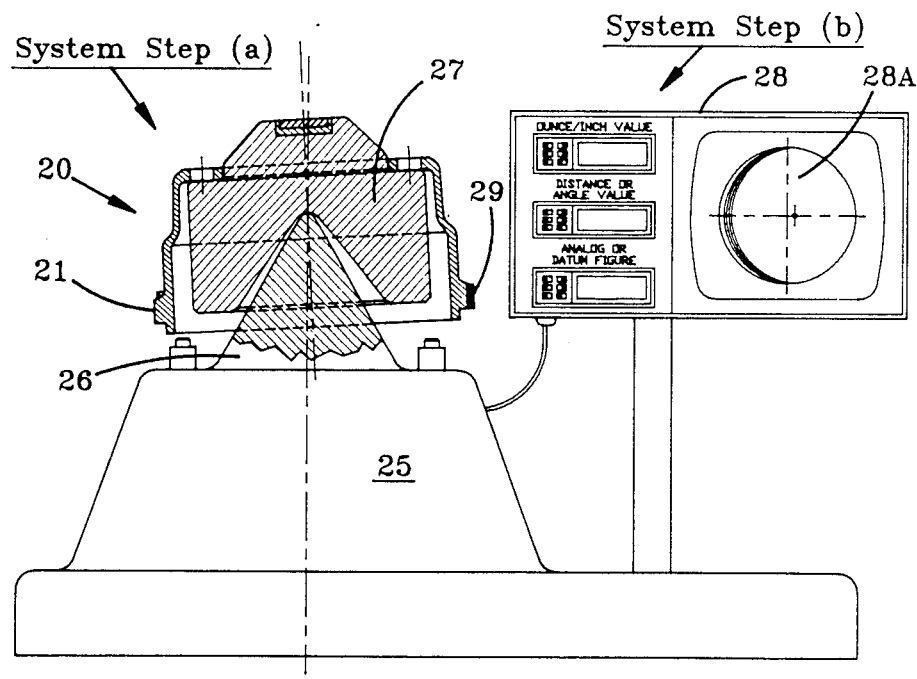
FIG. 3 is a schematic side view of a static balancer production station used for all embodiments of the invention.

After observing the direction of the imaginary line extending from the axis of the balancer 25 toward the apparent center of the imbalance, a reference point 29 is marked by the human or robotic operator on an outside drum surface, usually the squealer band 21. As best seen in FIG. 3, the reference point 29 is marked along the imaginary line one hundred eighty (180) degrees from the apparent center of the imbalance. This is the fourth step (d) in a system according to the invention.

Figure 4:
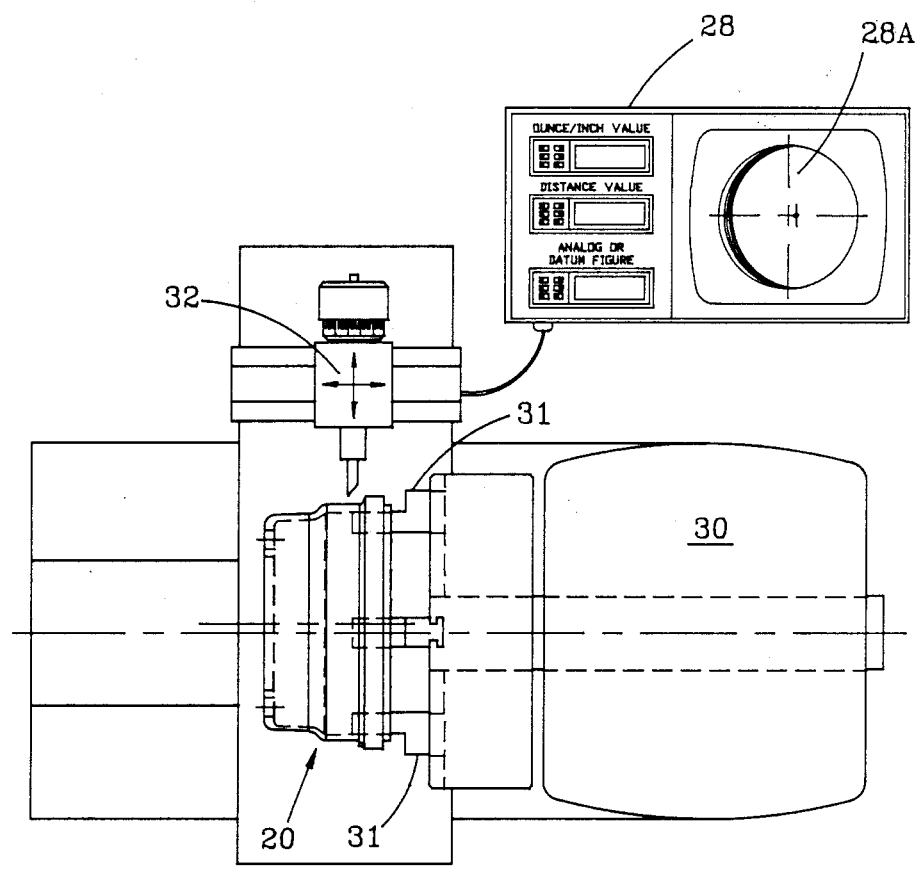
FIG. 4 is a schematic view of a lathe production station with radially adjustable chuck used for the first, second and third principal embodiments of the invention; and, FIG. 5 is a schematic view of a lathe production station with a tilted chuck used for the fourth and fifth principal embodiments of the invention.
Figure 5:
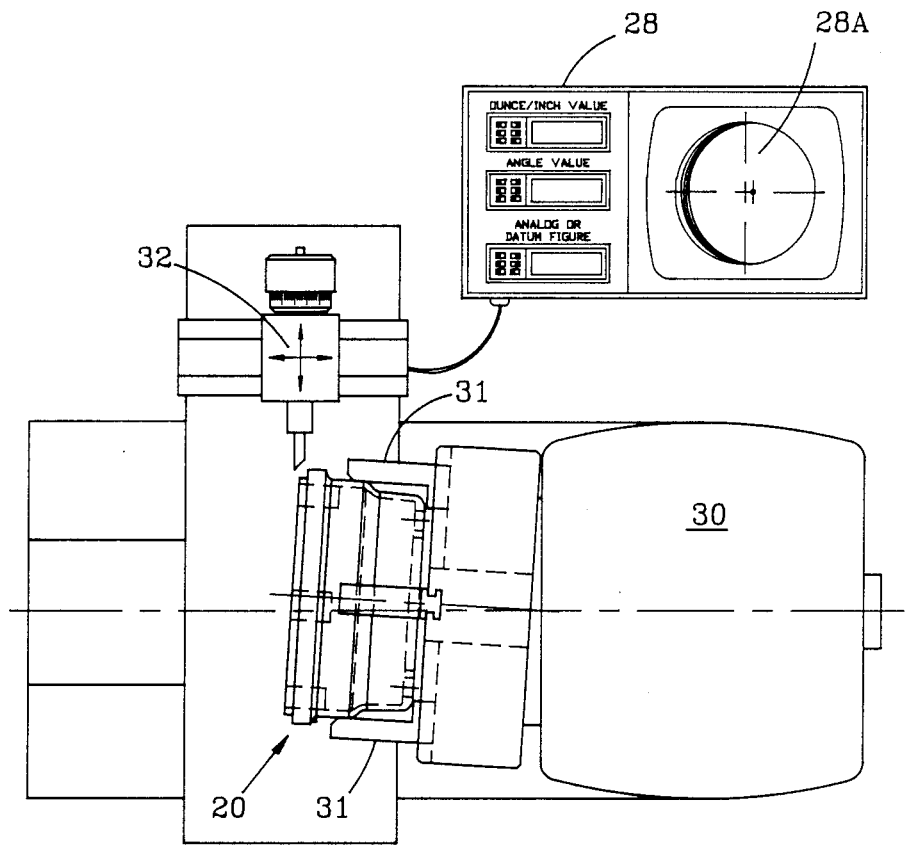

Then, the imbalanced drum 20 is transferred to a conventional lathe 30. The lathe 30 has chuck 31 for positioning and clamping the drum 20 relative to the turning axis of the lathe. The an adjustable chuck 31 may be radially shifted to a side (FIG. 4) or tilted relative to the axis of the lathe 30 (FIG. 5). The lathe 30 also has an incrementally adjustable cutting tool 32.

At the production station with the lathe 30, the drum 20 marked at 29 is clamped in the chuck 31 in a determined position established by an analog for the ounce/inch value recorded at 28 using the static balancer 25, which is the fifth step (e) in a system according to the invention.

Concurrently, the drum 20 is positioned in the chuck 31 so that the reference point marked at 29 is aligned one hundred eighty (180) degrees or opposite to the leading edge of the cutting tool 32, which is the sixth step (f) in a system according to the invention. Thereafter, the lathe 30 is actuated to turn the chuck 31 so that the cutting tool 32 will incrementally cut away an outer surface of a drum 20 to a depth established by an analog determined and recorded at 28 using the static balancer 25. This is the last or seventh step (g) in a system according to the invention.

EXAMPLES

Figure 2:
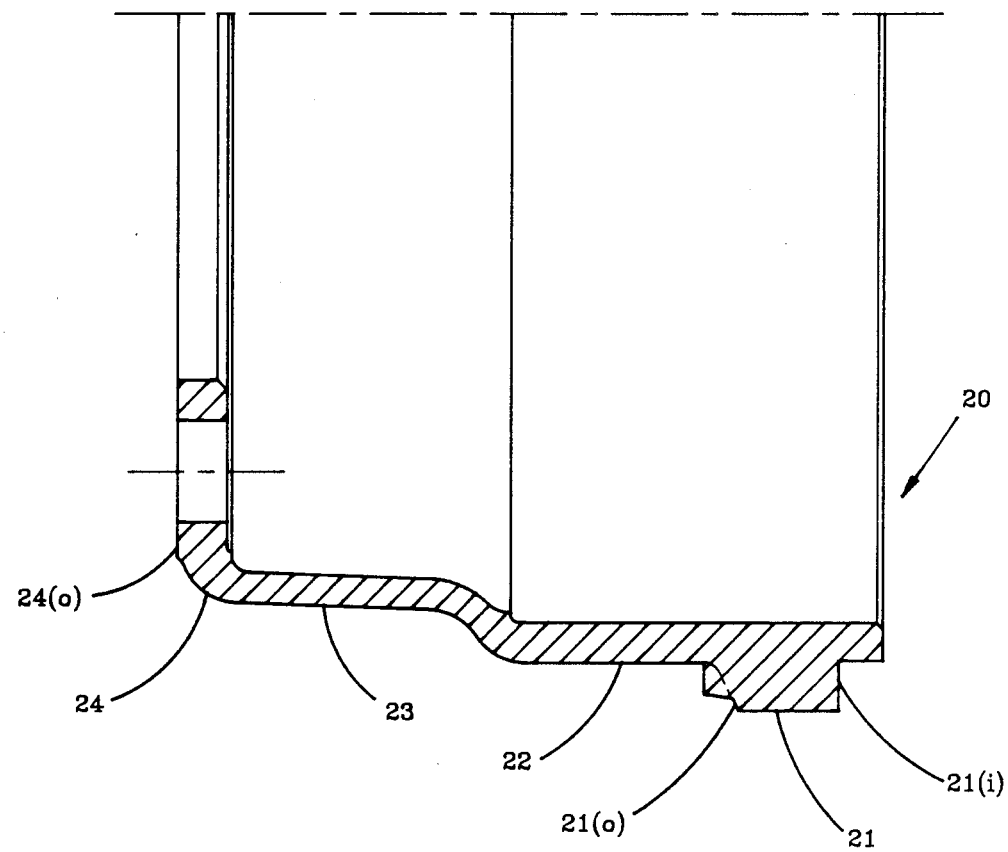
FIG. 2 is a sectional view taken on line 1—1 of FIG. 1.

To practice the invention for acceptable final balance of a brake drum 20 having a designed configuration as shown in FIGS. 1 and 2, with a design weight of 56.70 kilograms or 125 pounds and a maximum radial dimension for the squealer band 21 435.90 millimeters or 17.161 inches, illustrative values (in inches) for positioning of the lathe chuck 31 relative to the normal turning axis of the lathe 30 and a cutting depth (in inches) for the lathe cutting tool 32 may be:

First embodiment (and claims 2 and 5), recorded at 28, ounce/inch value 3.54 to 39.18, chuck 31 offset position variable center line 0.010 through 0.050 as an analog or datum figure, and tool 32 variable cutting depth for crescent cut 0.010 through 0.060;

Second embodiment (and claims 3 and 5), recorded at 28, ounce/inch value 3.54 to 39.18, chuck 31 offset position fixed center line at 0.040, and tool 32 variable cutting depth for crescent cut 0.010 through 0.060 as an analog or datum figure;

Third embodiment (and claims 4 and 5), recorded at 28, ounce/inch value 22.83 to 25.95, chuck 31 offset position variable center line 0.030 through 0.050 as an analog or datum figure, and tool 32 fixed cutting depth for crescent cut 0.040, or, recorded at 28, ounce/inch value 30.52 to 32.60, chuck 31 offset position variable center line 0.030 through 0.050 as an analog or datum figure, and tool 32 fixed cutting depth for crescent cut 0.050;

The first, second and third embodiments may position the cutting tool 32 to cut away a crescent from a drum surface 21, 22 or 23.

Fourth embodiment (and claims 6 and 7), recorded at 28, ounce/inch value 2.63 to 39.69, chuck 31 tilt angle one (1) degree through fifteen (15) degrees, and tool 32 variable cutting depth for wedge cut 0.020 through 0.120; and, Fifth embodiment (and claims 6 and 8), recorded at 28, ounce/inch value 5.14 to 39.69, chuck 31 tilt angle one (1) degree through fifteen (15) degrees, and tool 32 fixed cutting depth for wedge cut 0.120.

The fourth and fifth embodiments may position the cutting tool 32 to cut away a wedge from a drum surface 21(*i*) or 21(*o*).

What is claimed is:

1. A system for production of foundry cast metal brake drums (20) with a squealer band (21) and other outside surfaces which have been first machined to designed dimensions, said system using a conventional static balancer (25) and a conventional turning lathe (30) with an adjustable chuck (31) for positioning and clamping a first machined brake drum 20 and an incrementally adjustable cutting tool (32) for removing metal from outer surface areas of a first machined brake drum 20 on said lathe chuck 31, said system comprising of steps of:
   (a) determining on said static balancer 25 whether a first machined brake drum 20 has an acceptable final balance, and if the first machined brake drum 20 has a determined imbalance which is not acceptable;
   (b) recording by a sensor unit (28) integrated with said static balancer 25 an analog or datum figure for the ounce/inch value of the determined imbalance of said drum 20 when on said static balancer 25; while,
   (c) observing when viewing said drum 20 on said balancer 25 an imaginary line extending from the axis of said balancer 25 toward the apparent center of the determined imbalance; and,
   (d) marking a reference point (29) for said observed imaginary line on an outer surface of said drum 20 at a point opposite the apparent center of imbalance, and then transferring said marked drum (20+29) to said turning lathe 30; and,
   (e) clamping said marked drum 20+29 in said adjustable chuck 31 in a determined position established by the analog or datum figure for the ounce/inch value recorded using said sensor unit 28 integrated with said static balancer 25; while,
   (f) aligning the position of said drum 20 in said chuck 31 so that said reference point 29 marked on an outer surface of a drum 20 is opposite to the leading edge of said cutting tool 32; and, finally, (g) turning said lathe chuck 31 so that said cutting tool 32 will incrementally cut away an outer surface of a drum 20 to a depth established by an analog or datum figure for the ounce/inch value determined and recorded using said sensor unit 28 integrated with said static balancer 25.

2. A system according to claim 1 wherein: for step (e), said marked drum 20+29 is clamped in said adjustable chuck 31 in a radially offset position which is a distance analog for the ounce/inch value recorded using said sensor unit 28 integrated with said static balancer 25; and for step (g), said cutting tool 32 will incrementally cut away a crescent from said outer surface to a variable depth which is a distance analog for the ounce/inch value recorded using said sensor unit 28 integrated with said static balancer 25.

3. A system according to claim 1 wherein: for step (e), said marked drum 20+29 is clamped in said adjustable chuck 31 in a radially offset position which is a distance predetermined by experience with an ounce/inch imbalance amount for other brake drums 20 of the same design; and for step (g), said cutting tool will incrementally cut away a crescent from said outer surface to a variable depth which is a distance analog for the ounce/inch value recorded using said sensor unit 28 integrated with said static balancer 25.

4. A system according to claim 1 wherein: for step (e), said marked drum 20+29 is clamped in said adjustable chuck 31 in an offset position which is a distance analog for the ounce/inch value recorded using said sensor unit 28 integrated with said static balancer 25; and for step (g), said cutting tool 32 will incrementally cut away a crescent from said outer surface to a fixed depth which is a distance predetermined by experience with the ounce/inch imbalance amount for other brake drums 20 of the same design.

5. A system according to claim 2 or 3 or 4 wherein: for step (g), said cutting tool 32 will incrementally cut away a crescent from a squealer band 21 outer surface.

6. A system according to claim 1 wherein: for step (e), said marked drum 20+29 is positioned and clamped in said lathe chuck 31 so that the turning axis of said lathe 30 is tilted at an angle from the designed center axis of the drum which is an angle analog for the ounce/inch value recorded using said sensor unit 28 integrated with said static balancer 25; and for step (g), turning said lathe chuck 31 so that said cutting tool 32 will incrementally cut away a wedge from an edge of a drum squealer band 21 to a depth established by an analog for the ounce/inch value recorded using said sensor unit 28 integrated with said static balancer 25.

7. A system according to claim 6 wherein: for step (g), said cutting tool 32 will incrementally cut away a wedge from an edge of a drum squealer band 21 to a variable depth which is a distance analog for the ounce/inch value recorded using said sensor unit 28 integrated with said static balancer 25.

8. A system according to claim 6 wherein: for step (g), said cutting tool 32 will incrementally cut away a wedge from an edge of a drum squealer band 21 to a fixed depth which is a distance predetermined by experience with the ounce/inch imbalance amount for other brake drums 20 of the same design.

* * * * *